United States Patent
Peters et al.

(10) Patent No.: US 12,304,496 B2
(45) Date of Patent: May 20, 2025

(54) METHOD FOR ADAPTING A FUNCTIONALITY OF A VEHICLE THAT IS AUTOMATICALLY CARRIED OUT BY AN ASSISTANCE SYSTEM, AND A DRIVER ASSISTANCE SYSTEM

(71) Applicant: MERCEDES-BENZ GROUP AG, Stuttgart (DE)

(72) Inventors: Steven Peters, Schwieberdingen (DE); Dimitra Theofanou-Fuelbier, Esslingen (DE); Jens Eisele, Stuttgart (DE); Joana Hois, Böblingen (DE); Stefan Studer, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 184 days.

(21) Appl. No.: 17/910,116

(22) PCT Filed: Feb. 16, 2021

(86) PCT No.: PCT/EP2021/053724
§ 371 (c)(1),
(2) Date: Sep. 8, 2022

(87) PCT Pub. No.: WO2021/180433
PCT Pub. Date: Sep. 16, 2021

(65) Prior Publication Data
US 2023/0095245 A1     Mar. 30, 2023

(30) Foreign Application Priority Data
Mar. 9, 2020   (DE) ............... 10 2020 001 539.5

(51) Int. Cl.
*B60W 40/08*  (2012.01)
*B60W 50/00*  (2006.01)
*B60W 60/00*  (2020.01)

(52) U.S. Cl.
CPC ............ *B60W 40/08* (2013.01); *B60W 60/00* (2020.02); *B60W 2050/0063* (2013.01); *B60W 2050/0075* (2013.01); *B60W 2540/22* (2013.01)

(58) Field of Classification Search
CPC ............... B60W 40/08; B60W 60/00; B60W 2050/0063; B60W 2050/0075;
(Continued)

(56) References Cited

U.S. PATENT DOCUMENTS 6,226,588 B1   5/2001   Teramura et al.
10,373,259 B1  8/2019   Konrardy et al.
(Continued)

FOREIGN PATENT DOCUMENTS

DE   102004023544 A1   12/2005
DE   102018001375 A1   10/2018
(Continued)

OTHER PUBLICATIONS

International Search Report mailed Apr. 23, 2021 in related/corresponding International Application No. PCT/EP2021/053724.
(Continued)

*Primary Examiner* — James J Lee
*Assistant Examiner* — Alexander George Matta
(74) *Attorney, Agent, or Firm* — PATENT PORTFOLIO BUILDERS PLLC

(57) ABSTRACT

A method adapts vehicle functionality that is automatically carried out by an assistance system. In a method in which misunderstandings between driver and vehicle are prevented in predetermined driving situations, when the driver aborts the automatically carried out functionality, this abortion is recorded and saved. If the abortion frequency exceeds a predetermined threshold value, the aborted functionality is replaced by a modified or new functionality.

9 Claims, 2 Drawing Sheets

Figure 1:
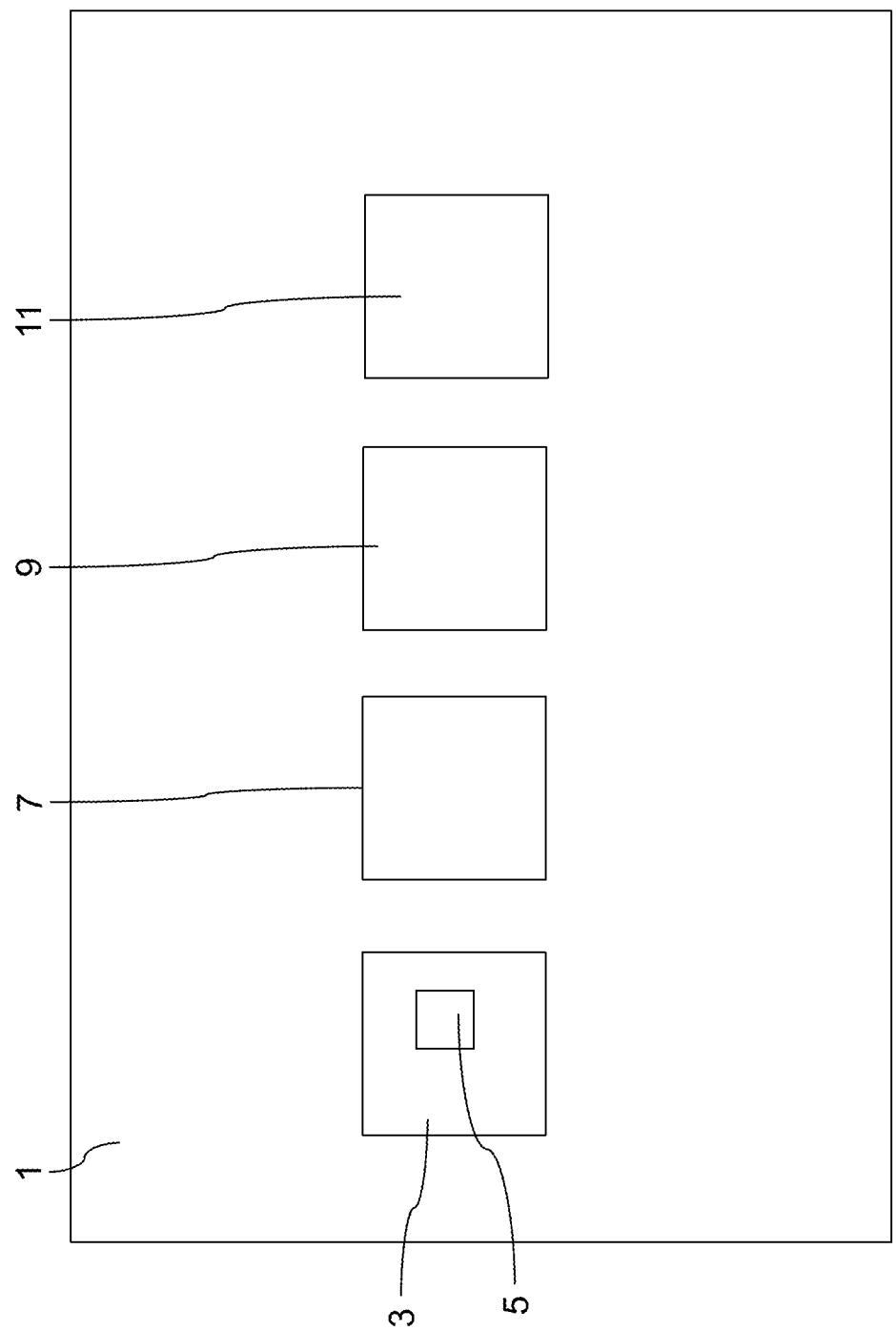

(58) Field of Classification Search
CPC .............. B60W 2540/22; B60K 35/10; B60K 2360/175; B60K 35/28
See application file for complete search history.

(56) References Cited

U.S. PATENT DOCUMENTS

| | | | |
|---|---|---|---|
| 2008/0065293 | A1 | 3/2008 | Placke et al. |
| 2017/0010618 | A1* | 1/2017 | Shashua ............... B62D 15/025 |
| 2017/0369072 | A1 | 12/2017 | Huber |
| 2018/0050696 | A1* | 2/2018 | Misu .................... A61B 5/6893 |
| 2018/0105184 | A1* | 4/2018 | Urano ................. B60K 31/0008 |
| 2018/0127001 | A1 | 5/2018 | Ricci |
| 2019/0185009 | A1 | 6/2019 | Werner et al. |
| 2019/0263395 | A1 | 8/2019 | Hoetzer et al. |
| 2020/0133303 | A1* | 4/2020 | Sakaguchi ......... G01C 21/3896 |
| 2021/0380117 | A1* | 12/2021 | Gonzalez ............. B60W 30/12 |
| 2022/0281461 | A1* | 9/2022 | Gentner ............... B60W 40/08 |

FOREIGN PATENT DOCUMENTS

| | | |
|---|---|---|
| DE | 102018203178 A1 | 9/2019 |
| DE | 102019202195 A1 | 9/2019 |
| JP | 2000118263 A | 4/2000 |
| JP | 2017193210 A | 10/2017 |
| JP | 2018181269 A | 11/2018 |

OTHER PUBLICATIONS

Office Action created Feb. 3, 2021 in related/corresponding DE Application No. 10 2020 001 539.5.
Written Opinion mailed Apr. 23, 2021 in related/corresponding International Application No. PCT/EP2021/053724.
Notice of Reasons for Refusal dated Oct. 6, 2023 in related/corresponding JP Application No. 2022-553643.
Office Action dated Feb. 28, 2025 in related/corresponding CN Application No. 202180019584.5.

* cited by examiner

METHOD FOR ADAPTING A FUNCTIONALITY OF A VEHICLE THAT IS AUTOMATICALLY CARRIED OUT BY AN ASSISTANCE SYSTEM, AND A DRIVER ASSISTANCE SYSTEM

BACKGROUND AND SUMMARY OF THE INVENTION

Exemplary embodiments of the invention relate to a method for adapting a functionality of a vehicle that is automatically carried out by an assistance system, as well as a driver assistance system for carrying out the method.

DE 10 2004 023 544 A1 discloses a method in which a driver can activate a functionality in a training and configuration mode. An assistance system records the driving style of the driver when the training and configuration mode is active. If the driver has mastered a traffic situation according to their idealistic conceptions and wants to set the functionality according to their demonstrated driving behavior in the vehicle, they confirm acceptance of the setting by pressing a corresponding button or by specifying a corresponding command.

As assistance systems in vehicles become better and better but also more and more complex, functionalities performed automatically by the vehicle can be set in individual driving situations, which can lead to misunderstanding on the part of the driver.

Exemplary embodiments of the invention are directed to a method for adapting a functionality of a vehicle that is automatically carried out by an assistance system and a driver assistance system in which misunderstandings between the driver and the vehicle are prevented in predetermined driving situations.

Further features, possible applications and advantages of the invention result from the following description, as well as from the explanation of exemplary embodiments of the invention, which are shown in the figures.

According to embodiments there is a method for adapting a functionality of a vehicle that is automatically carried out by an assistance system in that, in the event that the driver aborts the automatically carried out functionality, this abortion is recorded and saved, wherein if the abortion frequency exceeds a predetermined threshold value, the aborted functionality is replaced by a modified or new functionality. The term functionality is understood to be, for example, an information output such as an explanation to a user, an activation of a function of the or a further assistance system or an infotainment system. The functionalities set by the assistance system are thus customized in accordance with the wishes or usual behaviors of the driver and adapted accordingly. In this way, misunderstandings between the vehicle and the driver can be largely prevented in the future and confidence in the assistance system can be increased.

In one embodiment, the abortion of the current functionality of the vehicle automatically set by the vehicle is carried out by a manual setting of the desired functionality by the driver. Thus, the new or changed functionality is directly specified by the driver.

In a further embodiment, the changed or new functionality is carried out after confirmation by the driver. The confirmation by the driver ensures that the functionality desired by the driver is actually activated. An adaptation of the changed or new functionality only takes place after confirmation by the driver.

In a further embodiment, if a functionality is aborted or the predetermined threshold value is exceeded, information is output to the driver about the criteria used to determine the aborted functionality. The driver is therefore informed why the functionality was aborted, which leads to a better understanding of the aborted vehicle functionality.

In a further embodiment, when the current functionality that is automatically carried out by the vehicle is aborted, its current sensor signals related to the driving context are saved in each case and taken into account in the evaluation of the frequency of the abortion, including when the new functionality is triggered. Here, the sensor signals represent parameters that characterize the aborted functionality, as a result of which a comparison with previously aborted functionalities when determining the frequency of the abortion of the same functionality is simplified and can be carried out more precisely.

In a further embodiment, a location and/or a time and/or a vehicle-dependent event and/or an environment-dependent event are used as current sensor signals to be evaluated that are related to the driving context of the current functionality of the vehicle that is automatically carried out by the vehicle. Vehicle-dependent events include accelerating or braking or a lane change or setting the cruise control or other assistance systems. For example, wet conditions, black ice, or snow can be referred to as environment-dependent events.

In a further embodiment, the replacement of the current functionality automatically set by the vehicle with the desired functionality and the sensor signals characterizing the current functionality automatically set by the vehicle are saved in a driver profile of the vehicle. When there is a change of driver, the functionalities to be set automatically are then automatically set when the corresponding driver profile is accessed, as a result of which the vehicle is adapted to the driving behavior of the respective driver.

A development of the invention relates to a method for adapting a functionality of a vehicle that is automatically carried out by an assistance system. In the event of an abortion of the automatically carried out functionality, which is triggered by an evaluation of the driver's emotions, this abortion is recorded and saved, wherein if the abortion frequency exceeds a predetermined threshold value, the aborted functionality is replaced by a modified or new functionality. The evaluation of the driver's emotions, for example their facial expressions such as a shake of the head or speech, allows a quick detection of a misunderstanding between the vehicle and the driver, which can be corrected correspondingly quickly. Emotions can also be detected by monitoring pulse, blood pressure and facial expressions. A representative value determining the emotion is formed based on emotion-determining measured variables. As soon as the representative value passes a predetermined limit, an abortion of an automatically executed functionality is triggered. Alternatively, the abortion can only occur when a predetermined number of times the limit has been exceeded occurs. For example, during a route selection by the navigation system, a drop in emotion, i.e., well-being, is determined several times, whereupon a request is issued to the driver abort the route guidance and/or future replacement by an alternative route.

A further development of the invention relates to a driver assistance system for adapting a functionality of a vehicle that is automatically carried out by the assistance system to a driving behavior of a driver. The driver assistance system comprises an evaluation unit for recording the current, automatically carried out functionality of the vehicle which is aborted by the driver, which evaluation unit has a memory for saving the aborted functionality and is connected to a counter for determining a frequency of the abortion of the current, automatically set functionality generated by the driver, wherein a comparison unit triggers a triggering unit for activating a modified or new functionality when the frequency of the abortions determined by the counter exceeds a threshold value.

Further advantages, features and details emerge from the following description, in which—if necessary with reference to the drawing—at least one exemplary embodiment is described in detail. Described and/or pictorially depicted features can form the subject matter of the invention on their own or in any meaningful combination, if necessary also independently of the claims, and can in particular additionally also be the subject matter of one or more separate application(s). Identical, similar and/or functionally identical parts are provided with the same reference numerals.

BRIEF DESCRIPTION OF THE DRAWING FIGURES

Figure 2:
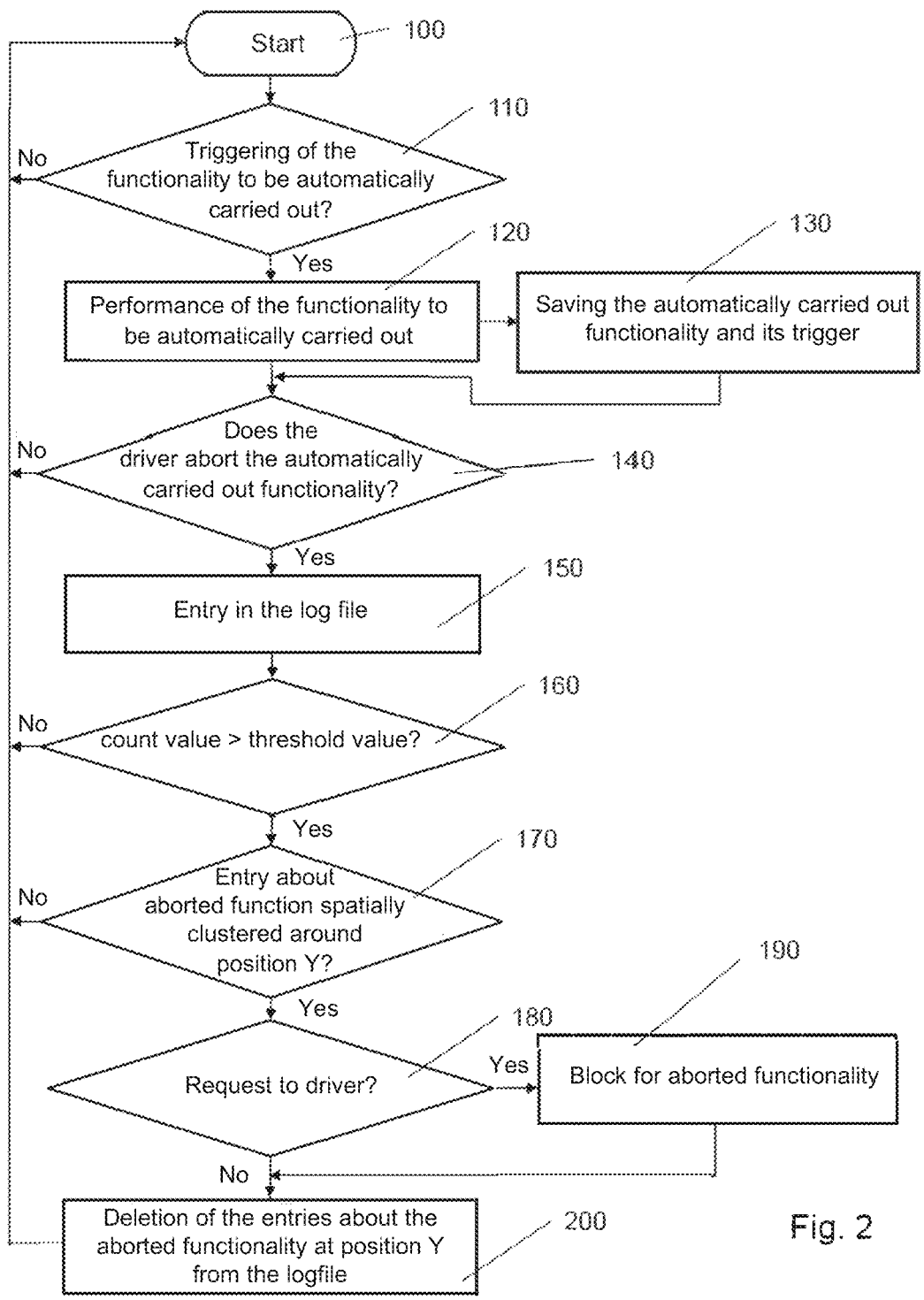

Here are shown:

FIG. 1 an exemplary embodiment of the driver assistance system according to the invention, FIG. 2 an exemplary embodiment of the method according to the invention.

DETAILED DESCRIPTION

In FIG. 1 an exemplary embodiment of a driver assistance system according to the invention is shown as it is used in vehicles. The driver assistance system 1 comprises an evaluation unit 3, in which a memory 5 designed as a ring buffer is arranged. The evaluation unit 3 is connected to a counter 7. The counter 7 is in turn coupled to a comparison unit 9, which outputs a signal to a trigger unit 11.

With the aid of FIG. 2, the principle of the method according to the invention as carried out by the driver assistance system 1 is explained. After the start of the method (block 100), a check is made in block 110 as to whether a trigger has triggered the driver assistance system 1 to perform a functionality of the vehicle to be automatically carried out. If this is the case, the driver assistance system carries out the functionality automatically set in the vehicle (block 120). In block 130, the current, automatically carried out functionality is saved in memory 5 together with the current sensor signals of the automatically carried out functionality that relate to the driving context. When using the ring buffer, the last automatically carried out functionality and its trigger are permanently saved for the last few seconds. Starting from block 120 or 130, it is determined whether the automatically carried out functionality was aborted by the driver (block 140). If this has not occurred, the system returns to the start (block 100). If the automatically carried out functionality was aborted by the driver, a log file is created in block 150 in which it is recorded that the automatically carried out functionality was aborted. For this purpose, the functionality that the vehicle has automatically carried out or which was intended to be carried out by the vehicle is logged with a GPS position of the vehicle when the functionality is aborted. For this purpose, the current, automatically carried out functionality that is saved in memory 5 is added together with the current sensor signals of the automatically carried out functionality that relate to the driving context as well as its trigger. Subsequently, it is checked in block 160 whether the number of entries of the aborted functionality in the log file determined by counter 7 exceeds a predetermined threshold value. If this is not the case, block 100 is returned to and the process is restarted.

If it is determined that the number of entries in counter 7 has exceeded the predetermined threshold value, a check is made in block 170 to determine whether the evaluated entries for the aborted functionality occur spatially clustered around a specific position Y. This is examined in the comparison unit 9 by comparing the GPS data stored in the log file. If a clustering of the evaluated entries at a certain position cannot be determined, block 100 is returned to. If a clustering is detected, the driver is asked whether the aborted functionality should no longer be carried out at position Y in the future (block 180). If the driver agrees, the driver assistance system 1 is instructed in block 190 to no longer carry out the aborted functionality at position Y. From block 180, if the driver denies the request, or from block 190, after saving the non-execution of the checked functionality, block 200 is moved to, where all entries for the examined functionality at position Y are deleted from the log file. After that, the process in block 100 starts again.

For better understanding, different applications of the described method shall now be presented. In a first case, the driver has set a predetermined route (current automatically carried out functionality) in their navigation system, which is stored in memory 5 together with the triggering action. The driver decides, however, not to follow the route set by the navigation system, but to abort this functionality by taking a different route, e.g., by not exiting at the next motorway exit contrary to the navigation plan, without switching off the navigation system or entering a new destination. They now activate the cruise control for a predetermined speed of the vehicle. The navigation system plans to drive on the original route, which is why the vehicle brakes before the exit. In this case, an explanation of why the vehicle is being braked is displayed to the driver so that they understand the vehicle behavior. If the predetermined route is aborted, it is saved in the log file together with the GPS position of the vehicle at which the abortion occurred and with the other data already stored in memory 5. The abortion of the route and the position of the abortion are counted by counter 7. It is then checked by the comparison unit 9 whether the automatically set route has already been aborted several times at the same position. If this is the case, the number of abortions registered in counter 7 at the same position is compared with a predetermined threshold value. If this is exceeded, the driver is asked whether the automatically carried out route should no longer be carried out at this position. If the driver agrees, this route will no longer be carried out at the specific position and will be replaced by the route taken by the driver.

In a further example, a distance assistance system that controls the distance of the vehicle from a vehicle in front shall be considered. The assisted driving vehicle (currently automatically carried out functionality) intends to brake to set the specified distance. However, the driver brakes earlier than the distance assistance system and thus aborts the automatically carried out control process, which is saved in memory 5 together with the triggering of the automatically triggered distance control process. The GPS position and the time of braking by the driver are now logged in the log file together with the data stored in memory 3. The counter 7 counts this braking by the driver before the braking by the vehicle. In order to eliminate misunderstandings between the driver and the vehicle, an explanation is issued to the driver by the vehicle as to why the vehicle wanted to brake when the distance from the vehicle in front had been reached. However, since the driver would like to brake earlier at a greater distance from the vehicle in front, it is checked whether a comparable situation has already occurred at the same GPS position. In the comparison unit 9, the entries of the counter 7 are compared with a predetermined threshold value. If this is exceeded, the distance assistance system is instructed by the trigger unit 11 to, in future, replace the braking of the vehicle at the calculated distance from the vehicle in front with the distance at which the driver braked.

In a further example, a lane-keeping system for maintaining a trajectory of the vehicle is considered. The lane-keeping system monitors a trajectory followed by the vehicle. The specified trajectory leads to a road marking being crossed, which is why the vehicle automatically carries out a braking and/or steering intervention (currently automatically carried out functionality) in order to return to the specified trajectory. The driver is irritated by this and overrides the automated action by an active steering intervention. At this point, the lane-keeping system outputs information as to why this automated braking and/or steering intervention has taken place. At the same time, the driver is asked whether this automatic steering or braking intervention should be deactivated in the future at the corresponding position or in general. If the driver agrees, the lane-keeping system is given corresponding instructions.

In many cases, a driver's displeasure with an automatically carried out functionality of the vehicle can be promptly detected, e.g., if a facial expression of the driver is evaluated by a face recognition system. Here, even before the driver initiates an action, the misunderstanding between the driver and the vehicle can be detected and the described method started.

Although the invention has been illustrated and explained in more detail by preferred exemplary embodiments, the invention is not limited by the disclosed examples and other variations may be derived from these by persons skilled in the art without departing from the scope of protection of the invention. It is therefore clear that a multitude of possible variations exist. It is also clear that exemplary embodiments are really only examples which are not to be understood in any way as limiting, for example, the scope of protection, the possible applications or the configuration of the invention. Rather, the preceding description and the description of the figures enable the person skilled in the art to implement the exemplary embodiments in practice, wherein the person skilled in the art, being aware of the disclosed idea of the invention, can make a variety of changes, for example with regard to the function or the arrangement of individual elements mentioned in an exemplary embodiment, without departing from the scope of protection defined by the claims and their legal equivalents, such as further explanation in the description.

The invention claimed is:

1. A method for adapting a functionality of a vehicle that is automatically performed by an assistance system of the vehicle, the method comprising:
   determining that the automatically performed functionality is aborted by a driver of the vehicle;
   recording and saving an indication of the abortion responsive to the determination that the automatically performed functionality is aborted;
   determining that a number of abortions of the automatically performed functionality exceeds a predetermined threshold value;
   determining a location of each of the number of abortions are spatially clustered around a position; and
   replacing, responsive to the determination that the number of the abortions exceeds the predetermined threshold value and to the determination that the location of each of the number of abortions are spatially clustered around the position, the aborted automatically performed functionality with a modified or new functionality to be performed at the position,
   wherein the automatically performed functionality is an automatically set route of the vehicle, and
   wherein the new or modified functionality is that, at the position, a route comprising an alternate road or alternate exit taken by the driver following the number of abortions replaces the automatically set route of the vehicle at the position.

2. The method of claim 1, wherein the driver aborts the automatically performed functionality by manually setting a desired functionality.

3. The method of claim 1, wherein if the automatically performed functionality is aborted or the predetermined threshold value is exceeded, information is output to the driver about why the automatically performed functionality is aborted.

4. The method of claim 1, wherein the automatically performed functionality is aborted, a current sensor signal of the automatically performed functionality related to a driving context is saved and used in the evaluation of the number of the abortions, including when the new functionality is triggered.

5. The method of claim 4, wherein the current sensor signal is a location, a time, a vehicle-dependent event, or an environment-dependent event.

6. The method of claim 2, further comprising:
   saving, in a driver profile of the vehicle, the replacement of the functionality automatically carried out by the vehicle with the desired functionality and parameters of the functionality automatically set by the vehicle.

7. The method of claim 1, wherein the abortion of the automatically carried out functionality is triggered by an evaluation of the driver's emotions, wherein the abortion triggered by the evaluation of the driver's emotions is saved, and wherein the aborted functionality is replaced by a modified or new functionality responsive to a frequency of the abortion of the automatically carried out functionality triggered by the evaluation of the driver's emotions.

8. The method of claim 1, wherein the abortions are deviating from the automatically set route of the vehicle.

9. The method of claim 8, wherein the abortions further comprise activating cruise control for a speed of the vehicle, and wherein the new or modified functionality further comprises, at the position, a speed of the vehicle is set to the speed.

* * * * *